US012474710B2

(12) United States Patent
Yasui et al.

(10) Patent No.: US 12,474,710 B2
(45) Date of Patent: Nov. 18, 2025

(54) GUIDING A FOLLOWER BY CONTROLLING A MOBILE OBJECT

(71) Applicant: HONDA MOTOR CO., LTD., Tokyo (JP)

(72) Inventors: Yuji Yasui, Wako (JP); Eiji Haryu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/372,645

(22) Filed: Jul. 12, 2021

(65) Prior Publication Data

US 2022/0019228 A1 Jan. 20, 2022

(30) Foreign Application Priority Data

Jul. 14, 2020 (JP) .................. 2020-120515

(51) Int. Cl.
 *G05D 1/00* (2024.01)
(52) U.S. Cl.
 CPC ......... *G05D 1/0214* (2013.01); *G05D 1/0223* (2013.01)
(58) Field of Classification Search
 CPC .................................................... G05D 1/00
 See application file for complete search history.

(56) References Cited

U.S. PATENT DOCUMENTS 8,116,921 B2 * 2/2012 Ferrin .................. G05D 1/0227
 242/390.8
10,156,850 B1 * 12/2018 Ansari .............. B60W 30/0953
11,435,742 B2 * 9/2022 Devasia ............... G05D 1/0088
2006/0229804 A1 * 10/2006 Schmidt .............. G05D 1/0278
 701/2
2010/0063627 A1 * 3/2010 Kitahama .............. G05D 1/028
 901/1

(Continued)

FOREIGN PATENT DOCUMENTS

CN 106741028 5/2017
CN 108464915 8/2018

(Continued)

OTHER PUBLICATIONS

Japanese Office Action for Japanese Patent Application No. 2020-120515 mailed Jun. 27, 2023.

(Continued)

*Primary Examiner* — Aniss Chad
*Assistant Examiner* — Elizabeth J Slowik
(74) *Attorney, Agent, or Firm* — Amin, Turocy & Watson, LLP (57) ABSTRACT

A mobile object control method includes recognizing an object existing around a mobile object and a follower following the mobile object, generating a first trajectory, which is a target trajectory of the follower for the follower to move while avoiding contact with the object without considering the mobile object as an object that the follower is to avoid contact with, based on a result of the recognition, generating a second trajectory, which is a target trajectory of the mobile object, based on the first trajectory, and controlling a mechanism for moving the mobile object so that the mobile object moves along the second trajectory.

10 Claims, 9 Drawing Sheets

(56) References Cited

U.S. PATENT DOCUMENTS

| | | | |
|---|---|---|---|
| 2014/0100771 A1* | 4/2014 | Ekpar | G05D 1/0276 |
| | | | 701/400 |
| 2015/0025708 A1* | 1/2015 | Anderson | G01S 13/867 |
| | | | 340/463 |
| 2015/0081189 A1* | 3/2015 | Fairgrieve | B60W 30/16 |
| | | | 701/96 |
| 2015/0100158 A1* | 4/2015 | Tanigawa | G05D 1/0246 |
| | | | 901/1 |
| 2016/0167652 A1* | 6/2016 | Slusar | G01C 21/3461 |
| | | | 701/27 |
| 2017/0227968 A1* | 8/2017 | Klinger | G06V 20/17 |
| 2018/0235832 A1 | 8/2018 | Yamada et al. | |
| 2018/0260635 A1* | 9/2018 | Al-Dahle | G05D 1/0246 |
| 2018/0356819 A1 | 12/2018 | Mahabadi et al. | |
| 2019/0163185 A1* | 5/2019 | Bin-Nun | G07C 5/085 |
| 2019/0263393 A1* | 8/2019 | Han | G05D 1/0055 |
| 2019/0317508 A1* | 10/2019 | Zhang | G08G 1/167 |
| 2020/0066159 A1* | 2/2020 | Chase | G08G 1/166 |
| 2020/0089252 A1 | 3/2020 | Kim et al. | |
| 2020/0152035 A1* | 5/2020 | Kim | H04M 1/72424 |
| 2020/0286387 A1* | 9/2020 | Zhou | G08G 1/0175 |
| 2020/0346643 A1* | 11/2020 | Woon | B60W 60/00276 |
| 2021/0063178 A1* | 3/2021 | Modi | G01C 21/3667 |
| 2021/0163004 A1* | 6/2021 | Wiberg | B60W 30/165 |
| 2021/0221363 A1* | 7/2021 | Lai | G08G 1/165 |
| 2021/0223788 A1* | 7/2021 | Garcia | B60W 60/0057 |
| 2021/0232148 A1* | 7/2021 | Sui | G05D 1/0297 |
| 2021/0394671 A1* | 12/2021 | Zhu | G05D 1/0088 |
| 2022/0012988 A1* | 1/2022 | Avadhanam | G08G 1/166 |
| 2022/0024486 A1* | 1/2022 | Scott | G05D 1/0221 |

FOREIGN PATENT DOCUMENTS

| | | |
|---|---|---|
| CN | 108931991 | 12/2018 |
| CN | 109085820 | 12/2018 |
| CN | 109164830 | 1/2019 |
| CN | 110405767 | 11/2019 |
| CN | 110945450 | 3/2020 |
| JP | 2017-129909 | 7/2017 |
| JP | 2018-147476 | 9/2018 |
| JP | 2020-001544 | 1/2020 |
| KR | 10-2019-0083727 | 7/2019 |
| WO | 2018/195809 | 11/2018 |
| WO | 2019/214836 | 11/2019 |
| WO | 2020/073232 | 4/2020 |

OTHER PUBLICATIONS

Chinese Office Action for Chinese Patent Application No. 202110787084.8 mailed Oct. 21, 2023.

Japanese Office Action for Japanese Patent Application No. 2020-120515 mailed Nov. 21, 2023.

* cited by examiner

GUIDING A FOLLOWER BY CONTROLLING A MOBILE OBJECT

CROSS-REFERENCE TO RELATED APPLICATION

Priority is claimed on Japanese Patent Application No. 2020-120515, filed on Jul. 14, 2020, the content of which is incorporated herein by reference.

BACKGROUND

Field of the Invention

The present invention relates to a mobile object control method, a mobile object control device, a mobile object, and a storage medium.

Description of Related Art

Conventionally, an invention of mobile robot including a mobile robot main body, a descriptor that is disposed on the mobile robot main body and provided with a marker for describing the movement trajectory of the mobile robot on a movement plane, a detector that is disposed on the mobile robot main body and detects the movement trajectory described at the descriptor, a travel driver that drives the travel of the mobile robot main body, and a drive controller that drives and controls the travel driver so that the mobile robot main body travels along the movement trajectory detected by the detector is disclosed. (Japanese Unexamined Patent Application, First Publication No. 2018-147476).

An invention of trajectory transportation system including a transportation vehicle that transports passengers, a first obstacle detection vehicle that has a sensor for detecting obstacles on a trajectory ahead of the transportation vehicle, a second obstacle detection vehicle that has a sensor for detecting obstacles on the trajectory following the transportation vehicle, and a communication means that connects the transportation vehicle and the first obstacle detection vehicle in a communicable manner and in which the transportation vehicle decelerates based on the obstacle detection by the first obstacle detection vehicle is disclosed. (Japanese Unexamined Patent Application, First Publication No. 2020-1544).

SUMMARY

In the conventional art, it may not be possible to appropriately guide a follower by controlling a mobile object on a leading side.

The present invention has been made in consideration of such circumstances, and an object of the present invention is to provide a control device of a mobile object, a mobile object, a control method of a mobile object, and a program capable of appropriately guiding a follower by controlling a mobile object on a leading side.

The mobile object control method, mobile object control device, mobile object, and storage medium according to the present invention include the following configuration.

(1): A mobile object control method according to one aspect of the present invention is a mobile object control method executed by a computer including recognizing an object existing around a mobile object and a follower following the mobile object, generating a first trajectory, which is a target trajectory of the follower for the follower to move while avoiding contact with the object, without considering the mobile object as an object that the follower is to avoid contact with, based on a result of the recognition, generating a second trajectory, which is a target trajectory of the mobile object, based on the first trajectory, and controlling a mechanism for moving the mobile object so that the mobile object moves along the second trajectory.

(2): A mobile object control method according to another aspect of the present invention is a mobile object control method executed by a computer, including recognizing an object existing around a mobile object and a follower following the mobile object, generating a first trajectory, which is a target trajectory of the follower for the follower to move while avoiding contact with the object so as to pass through a location of the mobile object, based on a result of the recognition, generating a second trajectory, which is a target trajectory of the mobile object, based on the first trajectory, and controlling a mechanism for moving the mobile object so that the mobile object moves along the second trajectory.

(3): In the aspect (1) above, generating the first trajectory includes generating the first trajectory so that the follower avoids contact with the object and a degree of turning of the first trajectory is reduced.

(4): In the aspect (1) above, generating the second trajectory includes generating the second trajectory so that the second trajectory merges with the first trajectory on the way.

(5): In the aspect (1) above, generating the first trajectory includes generating the first trajectory so that the follower is able to move to a pre-given destination while avoiding contact with the object.

(6): In the aspect (1) above, the controlling includes controlling the mechanism for moving the mobile object to adjust a speed of the mobile object so that a distance between the mobile object and the follower is maintained at a constant interval.

(7): A mobile object control device according to another aspect of the present invention includes a storage device that stores a program, and a hardware processor, and is configured such that by executing the program stored in the storage device by the hardware processor, an object existing around a mobile object and a follower following the mobile object are recognized, a first trajectory, which is a target trajectory of the follower for the follower to move while avoiding contact with the object, is generated without considering the mobile object as an object that the follower is to avoid contact with, based on a result of the recognition, a second trajectory, which is a target trajectory of the mobile object, is generated so that the follower follows the mobile object so that the follower moves along the first trajectory, and a mechanism for moving the mobile object is controlled so that the mobile object moves along the second trajectory.

(8): A mobile object control device according to another aspect of the present invention includes a storage device that stores programs, and a hardware processor, and is configured such that by executing the program stored in the storage device by the hardware processor, an object existing around a mobile object and a follower following the mobile object are recognized, a first trajectory, which is a target trajectory of the follower for the follower to move while avoiding contact with the object, is generated so as to pass through a location of the mobile object, based on a result of the recognition, a second trajectory, which is a target trajectory of the mobile object, is generated so that the follower follows the mobile object and the follower moves along the first trajectory, and a mechanism for moving the mobile object is controlled so that the mobile object moves along the second trajectory.

(9): A mobile object according to another aspect of the present invention includes the mobile object control device according to the aspect (7) or (8), a body which is equipped with the mobile object control device and to which the movement mechanism is attached, and a detection device which is attached to the body, detects a periphery of the mobile object, and provides data for recognition to the recognizer.

(10): A storage medium according to another aspect of the present invention is a computer-readable non-transitory storage medium that stores a program causing a computer to recognize an object existing around a mobile object and a follower following the mobile object, generate a first trajectory, which is a target trajectory of the follower for the follower to move while avoiding contact with the object, based on a result of the recognition, generating a second trajectory, which is a target trajectory of the mobile object, based on the first trajectory, control a mechanism for moving the mobile object so that the mobile object moves along the second trajectory, and generate the first trajectory without considering the mobile object as an object that the follower is to avoid contact with, when generating the first trajectory.

(11): A storage medium according to another aspect of the present invention is a computer-readable non-transitory storage medium that stores a program causing a computer to recognize an object existing around a mobile object and a follower following the mobile object, generating a first trajectory, which is a target trajectory of the follower for the follower to move while avoiding contact with the object, based on a result of the recognition, generate a second trajectory, which is a target trajectory of the mobile object, based on the first trajectory, control a mechanism for moving the mobile object so that the mobile object moves along the second trajectory, and generate the first trajectory so as to pass through a location of the mobile object, when generating the first trajectory.

According to each of the above aspects, a follower can be appropriately guided by controlling a mobile object on a leading side.

According to the aspects (1), (7), and (10) above, it is possible to prevent the inconvenience that a first trajectory is curved to left and right to avoid contact with a mobile object by a follower by generating the first trajectory that prevents the mobile object from being recognized as an object that the follower is to avoid contact with.

According to the aspects (2), (8), and (11) above, a calculation load can be reduced, a follower F can be guided intuitively and easily, and further, a mobile object 1 can more reliably secure a path for the follower F by generating a first trajectory so as to pass through the location of the mobile object.

DESCRIPTION OF EMBODIMENTS

Hereinafter, a mobile object control method, a mobile object control device, a mobile object, and a storage medium according to an embodiment of the present invention will be described with reference to the drawings. The mobile object is, for example, a robot capable of autonomous movement in any form, leading a follower and autonomously moving to guide the follower to a desired location. The follower is, for example, a pedestrian, but may be a cyclist, a vehicle, etc. As an example, the follower is expected to be an elderly and a person to be cared. In the following description, it is assumed that the follower is a pedestrian. A place where many mobile objects (actually, it is often a person, but the follower and the object that exists around the mobile object are called objects regardless of whether they are mobile) in the vicinity exist, such as, an airport, an event hall, a large-scale train station, and the like, or a place where the follower is likely to get lost due to a large site, is assumed as a place where the mobile object is applied. It is not limited to this, and the mobile object may be used for various uses.

First Embodiment

Figure 1:
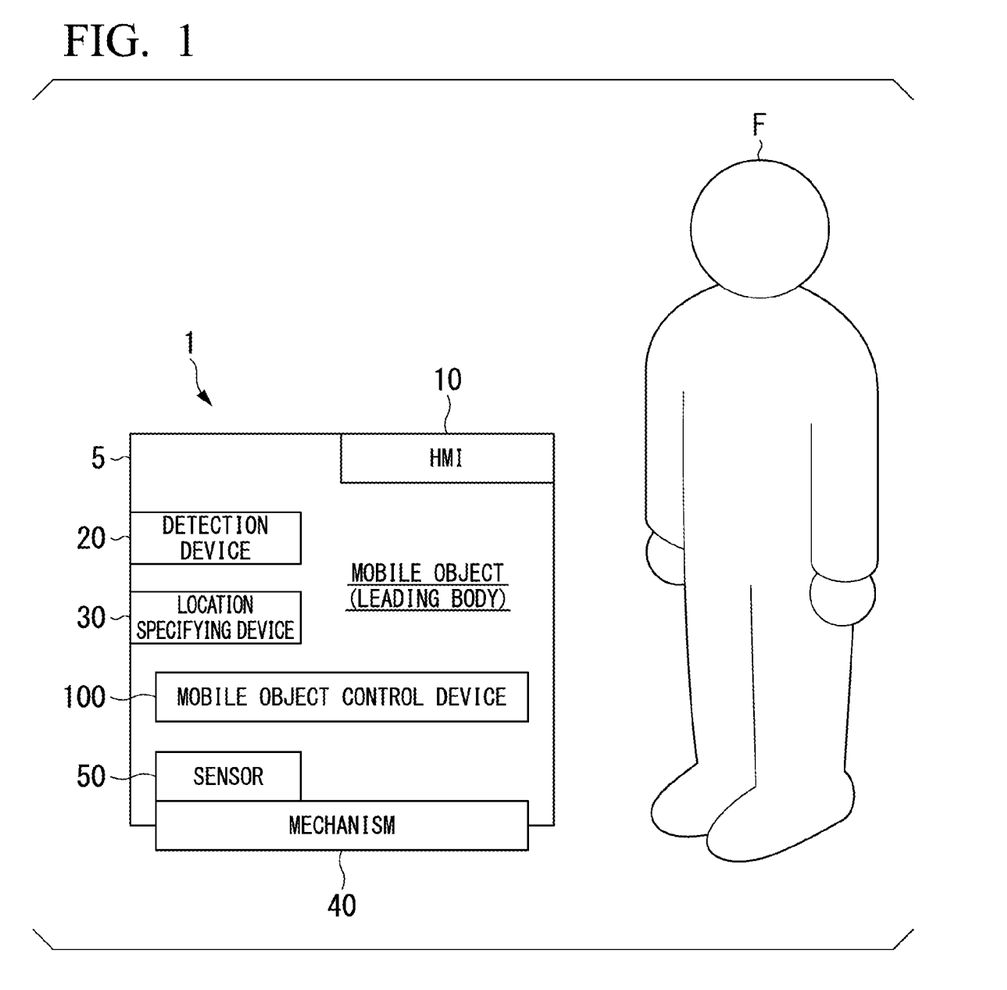
FIG. 1 is a diagram showing a configuration of a mobile object equipped with a mobile object control device together with a follower.

FIG. 1 is a diagram showing the configuration of a mobile object 1 equipped with a mobile object control device 100 together with a follower F. The mobile object 1 includes, for example, a body 5 on which the HMI 10, a detection device 20, a location specifying device 30, and a mobile object control device 100 are mounted, a mechanism 40 attached to the body 5, and a sensor 50 attached to the mechanism 40 and the like.

The HMI 10 presents various information to the follower F and receives an input operation by the follower F. The HMI 10 includes various display devices, a speaker, a buzzer, a touch panel, a switch, a key and the like. For example, the HMI 10 receives the input of the destination (such as "OO counter" in the case of an airport) by the follower F.

The detection device 20 is a device that generates data for recognizing an object existing around the mobile object 1 and the follower F. The detection device 20 includes, for example, a camera and radar device whose detection range is around the mobile object 1, a sensor such as a light detection and ranging (LIDAR), an ultrasonic sensor, etc., an object recognition device that specifies an object by performing sensor fusion processing based on the outputs of these sensors, and the like.

The location specifying device 30 is a device that specifies the location of the mobile object 1. The location specifying device 30 includes, for example, a global navigation satellite system (GNSS) receiver that specifies the location of a vehicle M based on a signal received from a GNSS satellite. The location specifying device 30 may specify or complement the location of the mobile object 1 by an inertial navigation system (INS) using the output of the sensor 50 described later. The location specifying device 30 may have an electromagnetic wave receiving function, and specify or complement the location of the mobile object 1 based on the strength of electromagnetic waves arriving from a surrounding electromagnetic wave source (whose location is known).

The mechanism 40 is a mechanism for moving the mobile object 1 including the body 5 in an arbitrary direction. The mechanism 40 includes, for example, a plurality of wheels, one or more drive motors attached to the wheels, and a steering device attached to the one or more wheels. There are no particular restrictions on the configuration of the mechanism 40, and the mechanism 40 may include a pseudo-foot part for bipedal walking.

The sensor 50 is a sensor that detects the behavior of the mobile object 1. The sensor 50 includes, for example, a wheel speed sensor that detects the speed of the wheel, an acceleration sensor that detects an acceleration acting on the mobile object 1, a yaw rate sensor that is attached near the center of gravity of the body 5 in a horizontal direction, a steering angle sensor that detects a steering angle of the wheel to be steered (steering wheel), a direction sensor that detects the direction about the horizontal direction of the mobile object 1, and the like.

Figure 2:
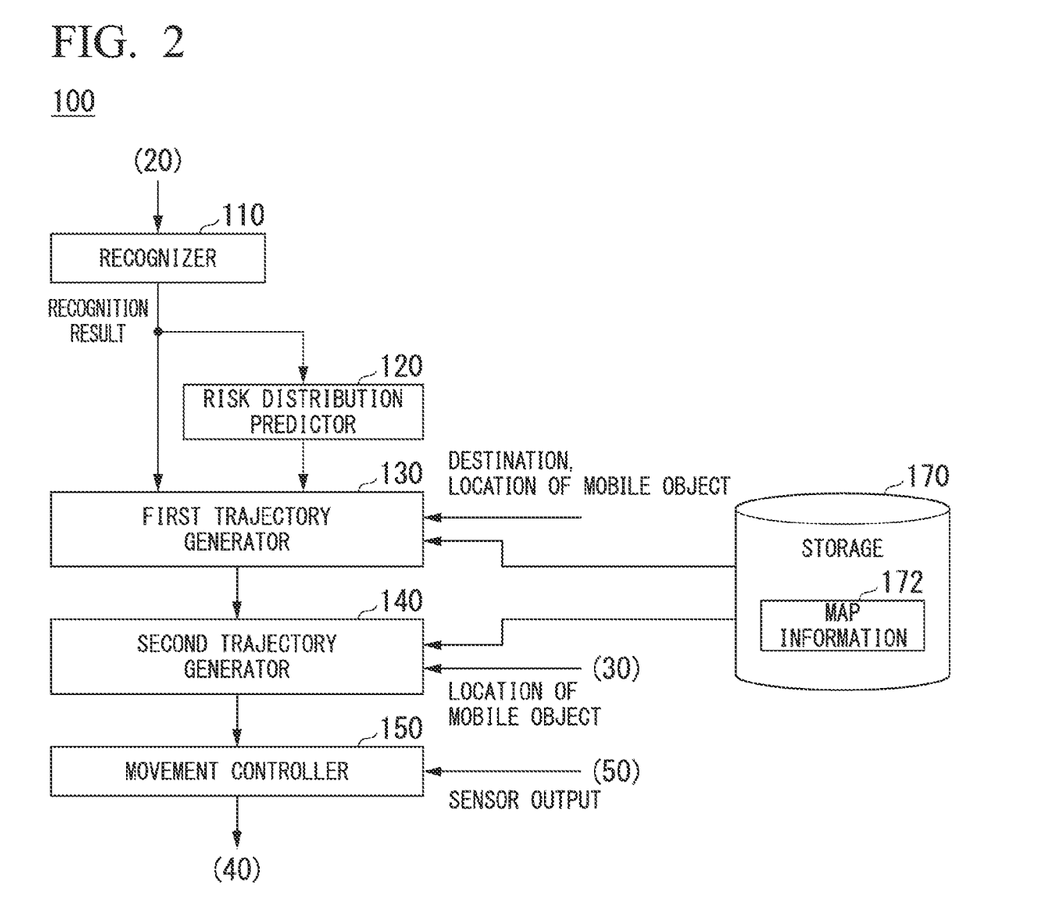
FIG. 2 is a diagram showing an example of a configuration of a mobile object control device.

FIG. 2 is a diagram showing an example of the configuration of the mobile object control device 100. The mobile object control device 100 includes, for example, a recognizer 110, a risk distribution predictor 120, a first trajectory generator 130, a second trajectory generator 140, a movement controller 150, and a storage 170. A component other than the storage 170 is realized by executing a program (software) by a hardware processor such as a central processing unit (CPU). Some or all of these components may be realized by a hardware (circuit unit; including circuitry) such as a large scale integration (LSI) or an application specific integrated circuit (ASIC), a field-programmable gate array (FPGA), a graphics processing unit (GPU), etc., or by the combination of software and hardware. The program may be stored in advance in a storage device such as a hard disk drive (HDD) or a flash memory (a storage device equipped with a non-transitory storage medium), or stored in a removable storage medium (non-transitory storage medium) such as a DVD or CD-ROM, and installed on the storage device by mounting the storage medium on the drive device. The storage 170 is realized by a storage device such as an HDD, a flash memory, or a random access memory (RAM). The storage 170 includes map information 172 and may also store the aforementioned programs. The map information 172 includes at least a local map of a place where the mobile object 1 moves.

The processing of the recognizer 110, the risk distribution predictor 120, the first trajectory generator 130, the second trajectory generator 140, and the movement controller 150 described below is repeatedly performed in a control cycle that arrives at a predetermined cycle. Therefore, it does not mean that the follower F moves according to a first trajectory K1 (described later) generated at some point until it reaches its destination, but the first trajectory K1 is updated by changes in the surrounding environment or unexpected movement of the follower F, and thus, the control contents of the mobile object 1 are updated based on the latest updated first trajectory K1.

The recognizer 110 recognizes an object existing around the mobile object 1 and the follower F based on the information input from the detection device 20. The recognizer 110 recognizes states such as the location, speed, acceleration and the like of the object and the follower F. For example, the locations of the object and the follower F are first recognized as relative locations as seen from the mobile object 1, and then the location of the follower F is set as an origin, and is converted into a location on an assumption plane S that represents the space around the follower F as a two-dimensional plane viewed from above, and used for the subsequent processing. In this case, since the location of the follower F is set as the origin, the location of the follower F as seen from the mobile object 1 is calculated backward, and the location of the mobile object 1 on the assumption plane S is recognized. The locations of the object and the follower F, and the mobile object 1 may be represented by representative points such as their center of gravity and corners and the like, or may be represented by the represented regions. In the following description, a location refers to a point.

The recognizer 110 refers to the map information 172 and recognizes the location of the follower F on the map. For example, the recognizer 110 recognizes the location of the follower F on the map by adding the relative location of the follower F as seen from the mobile object 1 to the location of the mobile object 1 specified by the location specifying device 30.

The risk distribution predictor 120 sets a risk, which is an index value indicating the degree to which the follower F should not enter or approach in the above-mentioned assumption plane S. The risk indicates that the follower F should not enter or approach as the value increases, and that the value closer to zero indicates that the follower F is preferable to pass through. However, this relationship may also be reversed. When the follower F is able to fly by boarding on aircraft, the risk distribution predictor 120 may perform the same processing in 3D space instead of the assumption plane S.

The risk distribution predictor 120 determines the risk on the assumption plane S not only at the moment such as current time t, after $\Delta t$ (time t+$\Delta t$), after 2$\Delta t$ (time t+2$\Delta t$), and so on, but also at each point in the future to be defined at a regular time interval. The risk distribution predictor 120 predicts the risk at each time point in the future based on the change in the location of a mobile object target that is continuously recognized by the recognizer 110.

Figure 3:
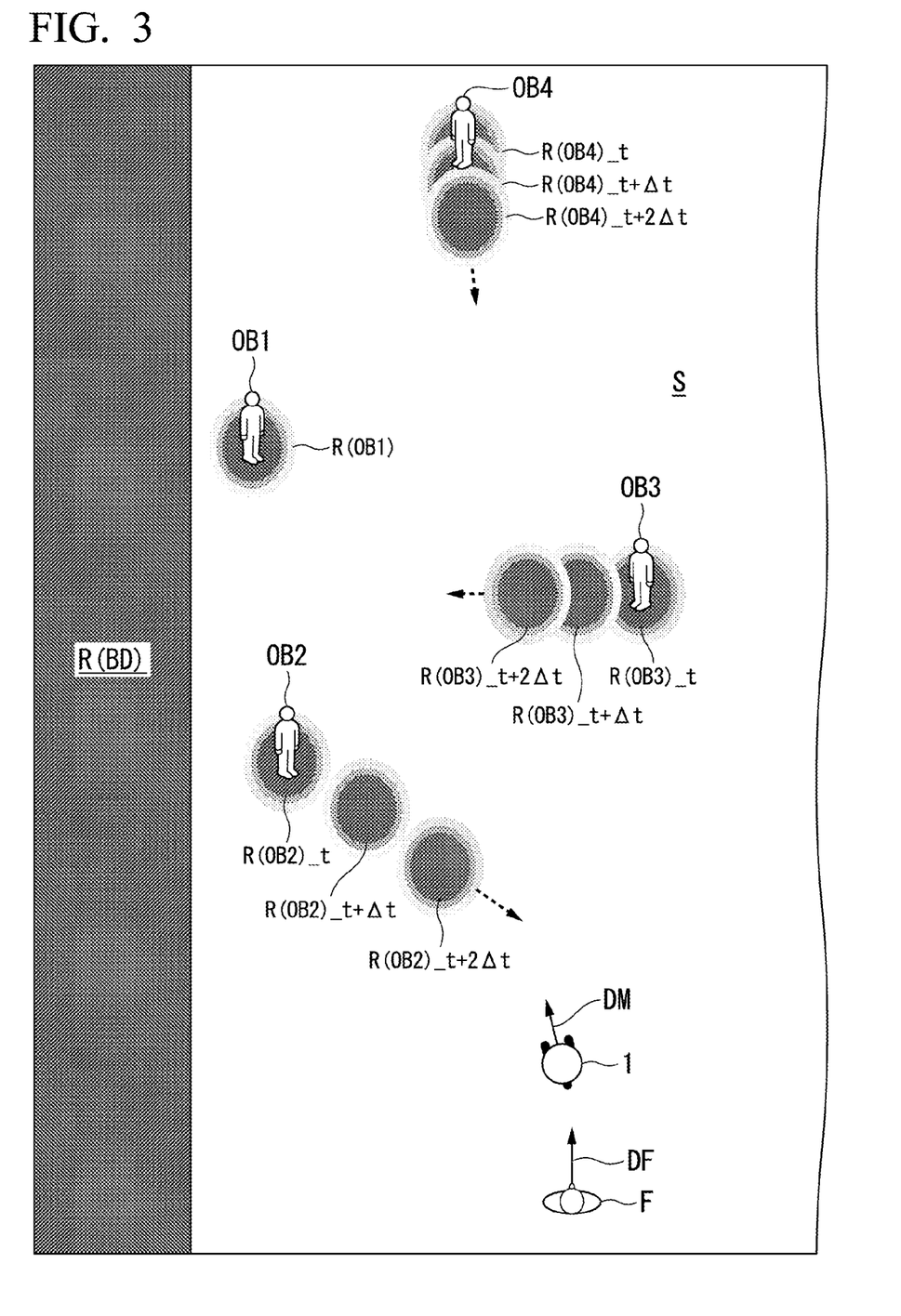
FIG. 3 is a diagram showing an outline of risk set by a risk distribution predictor.

FIG. 3 is a diagram showing an outline of the risk set by the risk distribution predictor 120. The risk distribution predictor 120 sets the risk to the object except the follower F and the mobile object 1 on the assumption plane S as an elliptical or circular contour line, based on a proceeding direction and a speed, and sets a predetermined value of risk for an immovable area BD such as a wall. In the figure, DF is the proceeding direction of the follower F, and DM is the proceeding direction of the mobile object 1. R(OB1) is the risk of a stationary object (person standing on the spot) OB1, R(OB2) is the risk of a moving object (pedestrian) OB2, and R(OB3) is the risk of a moving object (pedestrian) OB3, and R(OB4) is the risk of a moving body (pedestrian) OB4. As pedestrians continue to move, the risk is set at a location different from the current time at each time point in the future. R(OB2)_t is the risk of the object OB2 in a certain control cycle, R(OB2)_t+$\Delta t$ is the risk of the object OB2 in the next control cycle, and R(OB2)_t+$\Delta 2t$ is the risk of the object OB2 in the next control cycle of the next control cycle. R (BD) is the risk of immovable area BD. In the figure, the intensity of hatching indicates the value of risk, and the darker the hatching, the greater the risk.

Figure 4:
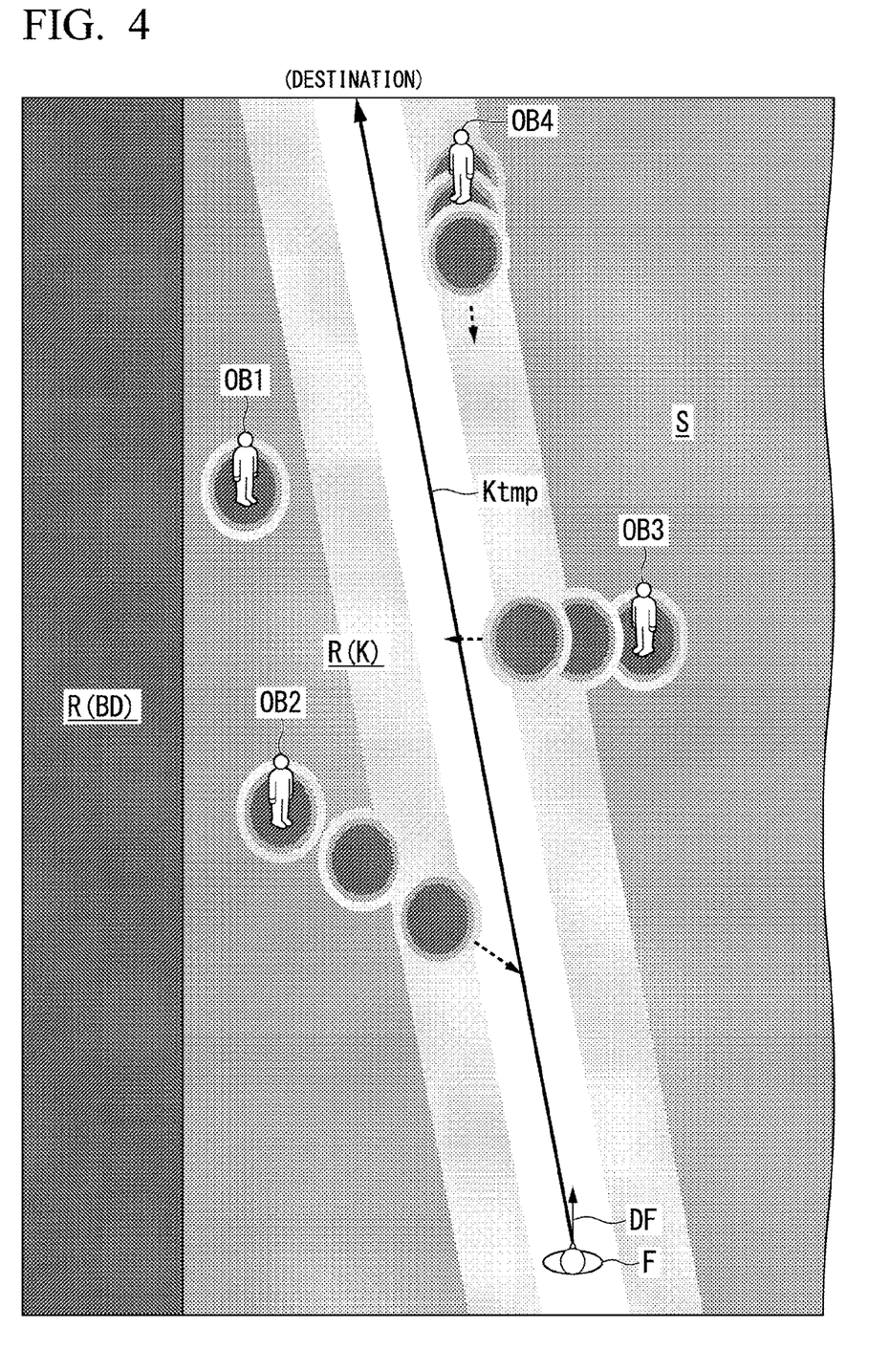
FIG. 4 is a diagram showing an example of risk distribution that is set in consideration of a deviation from a temporary movement path.

The risk distribution predictor 120 may set a temporary movement path based on the destination input by the follower F described above, the location of the follower F, and the map information 172, and the degree away from the temporary movement path may be added to the risk. FIG. 4 is a diagram showing an example of the risk distribution set in consideration of the deviation from the temporary movement path Ktmp. In the figure, R (K) is a risk based on the deviation from the temporary movement path Ktmp. In the example of FIG. 4, the temporary movement path Ktmp is set to be linear, but, according to the structure of the place where the follower F moves, the temporary movement path Ktmp may be set as a polygonal line or a curved line at a corner and the like where the follower F turns. In this case, the risk distribution predictor 120 (or other component) performs processing such as dividing the movement range into links and determining a detailed location for each link to generate a temporary movement path Ktmp.

In the above, it is assumed that the temporary movement path Ktmp is set toward the destination input by the follower F to the HMI 10, but the temporary movement path Ktmp may be set based on the body direction or face direction of the follower F, or voice instructions (such as "straight", "right") issued by the follower F, recognized by the recognizer 110.

The first trajectory generator 130 generates the first trajectory K1, which is a target trajectory of the follower F so that the follower F moves while avoiding contact with an object, based on the risk based on the recognition result of the recognizer 110. As described above, since the mobile object 1 is excluded from a risk target, the first trajectory generator 130 generates the first trajectory K1 without considering the mobile object 1 as an object that the follower F is to avoid contact with. The first trajectory K1 is, for example, expressed by sequentially arranging the point (trajectory point) to which the follower F should reach at every predetermined distance (for example, every about several tens [cm] to 1 [m]) with respect to the movement distance. The first trajectory K1 is given a target speed and a target acceleration for each predetermined sampling time (for example, about 0. commas [sec]). The first trajectory K1 may be a location to be reached by the follower F at the sampling time for each predetermined sampling time. In this case, the information on the target speed and the target acceleration is expressed by the interval of the trajectory points. When the follower F is a pedestrian, the target acceleration may be zero, that is, the first trajectory K1 may be generated as the one that moves at a constant speed.

Figure 5:
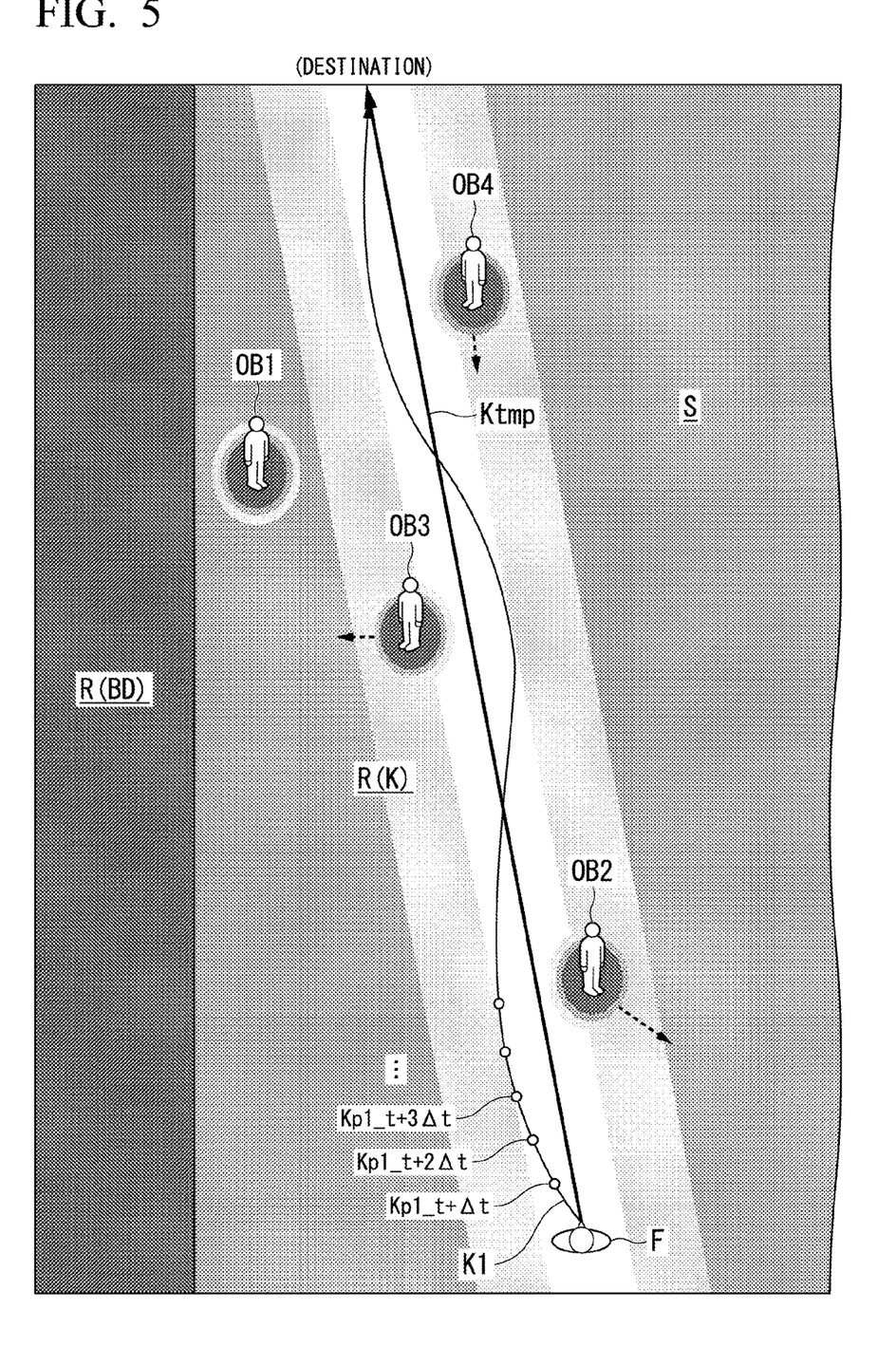
FIG. 5 is a diagram showing an example of a first trajectory generated by a first trajectory generator in the scene shown in FIG. 3 and FIG. 4.

FIG. 5 is a diagram showing an example of the first trajectory K1 generated by the first trajectory generator 130 in the scenes shown in FIGS. 3 and 4. In the figure, KP1_t+Δt, KP1_t+2Δt, and KP1_t+3Δt are trajectory points constituting the first trajectory K1. The locations of the objects OB2, OB3, and OB4 shown in the figure indicate their respective locations at the time when they are closest to the follower F. This first trajectory K1 defines the behavior at the time when the follower F moves toward the destination that the follower F first moves to the left as the object OB2 crosses in front of him from left to right, and then the follower F moves to the right as the object OB3 crosses in front of him from right to the left, and then the follower F moves while avoiding the object OB4 approaching in opposition to the left. In order to generate the first trajectory K1 in this way, the first trajectory generator 130 generates the first trajectory K1 by connecting successively the locations where, at each time point in the future, the risk corresponding to the time point does not exceed a threshold value, for example. The first trajectory K1 that satisfies this condition is not determined as one, but a first trajectory candidate K1c of multiple patterns is expected. The first trajectory generator 130 may calculate a score for each of the plurality of patterns of the first trajectory candidate K1c, and select the first trajectory candidate K1c having the highest score as the first trajectory K1. For example, the first trajectory generator 130 calculates the score so that the smaller the degree of turning (for example, it is evaluated by an angle formed by a vector from a past trajectory point to a target trajectory point and a vector from a target trajectory point to a future trajectory point) and the smaller the total risk for each passing point, the higher the score.

The second trajectory generator 140 generates a second trajectory K2, which is a target trajectory of the mobile object 1 so that the follower F follows the mobile object 1 and the follower F moves along the first trajectory K1. Similar to the first trajectory K1, the second trajectory K2 may be added with information on the target speed and the target acceleration. The second trajectory generator 140 is generated so that it can promptly join the first trajectory K1 starting from the location of the mobile object 1 at that time within the range of restriction (upper limit speed, upper limit acceleration, upper limit turning angle, etc.) on the behavior of the mobile object 1, for example. In addition to the above-mentioned purpose (within the range of restriction on the behavior of the mobile object 1, it is promptly merged with the first trajectory K1 from the location of the mobile object 1), the second trajectory generator 140 generates the second trajectory in consideration of the risk as in the first trajectory generator 130 up to the merging point. However, the degree of risk tolerance in the second trajectory K2 may be looser (allowing even a higher risk) than that of the first trajectory K1. This is because this is not possible to move forward if the approach to the object is suppressed too conservatively in a place where the degree of congestion is very high, and in such a case, rather, the effect that the mobile object 1 secures a route for the follower F is expected.

Figure 6:
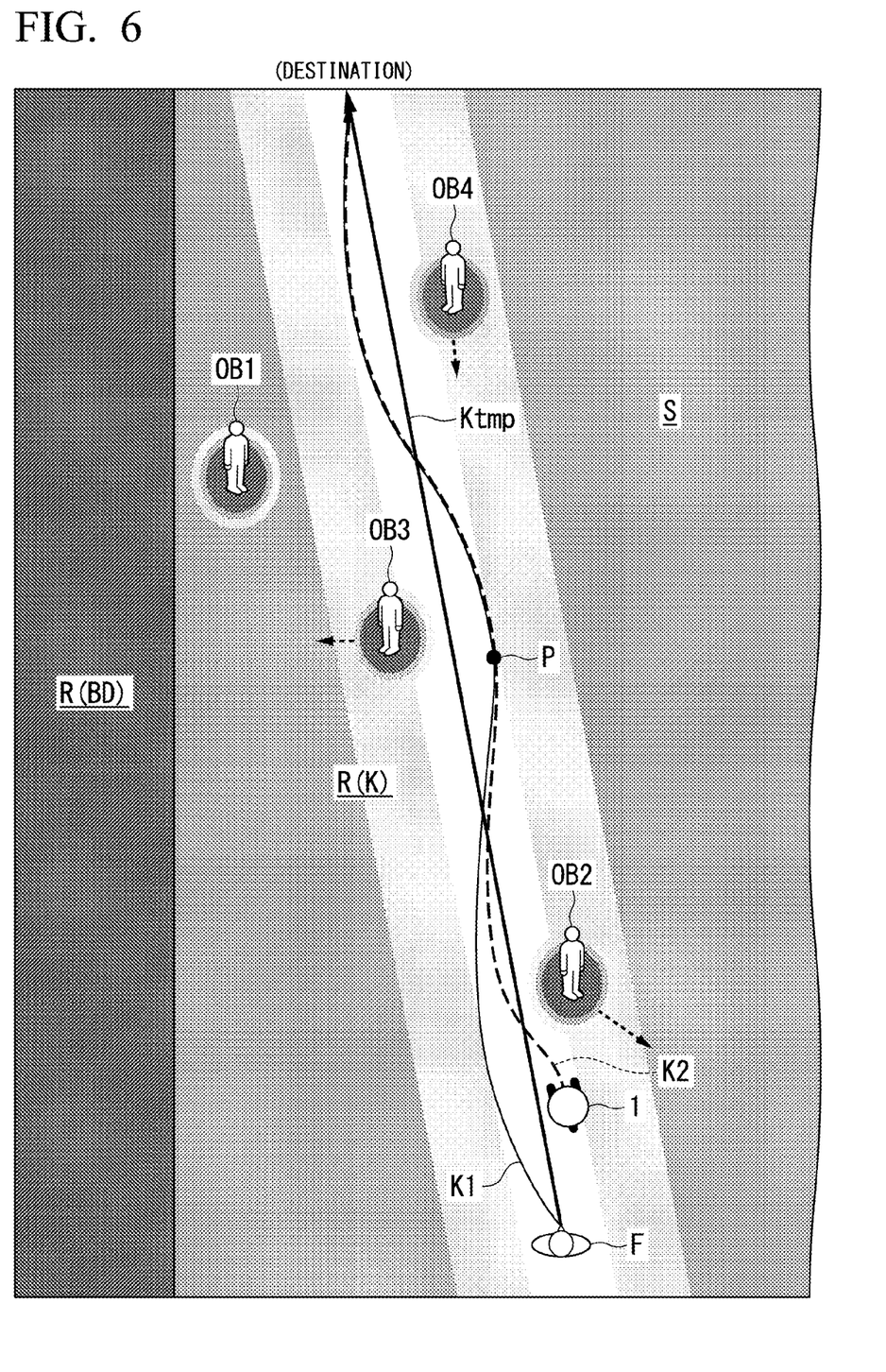
FIG. 6 is a diagram showing an example of a second trajectory generated by a second trajectory generator based on the first trajectory shown in FIG. 5.

FIG. 6 is a diagram showing an example of the second trajectory K2 generated by the second trajectory generator 140 based on the first trajectory K1 shown in FIG. 5. The second trajectory generator 140 generates the second trajectory K2 according to the above method. In the example of FIG. 6, at the point P in front of the proceeding direction of the follower F and the mobile object 1 (on the way of the first trajectory K1 and the second trajectory K2), the first trajectory K1 and the second trajectory K2 merge, and after merged, the first trajectory K1 and the second trajectory K2 match. By generating the second trajectory K2 in this way, the follower F can be guided to move along the first trajectory K1 by following the mobile object 1.

The movement controller 150 controls the mechanism 40 so that the mobile object 1 moves along the second trajectory K2. The movement controller 150 controls the drive motor and the steering device so that the location and behavior of the mobile object 1 obtained by the output of the sensor 50 approach the second trajectory K2. At this time, the movement controller 150 may adjust the speed of the mobile object 1 by feedback control so that the distance between the mobile object 1 and the follower F approaches a target distance. In this way, even if the speed of the follower F fluctuates for some reason, the follower F can be led by maintaining a constant interval.

According to the first embodiment described above, a follower can be appropriately guided by providing, the recognizer 110 that recognizes an object existing around the mobile object 1 and the follower F that follows the mobile object 1, the first trajectory generator 130 that generates the first trajectory K1, which is a target trajectory of the follower F for the follower F to move while avoiding contact with an object, based on the recognition result of the recognizer 110, the second trajectory generator 140 that generates the second trajectory K2, which is a target trajectory of the mobile object 1 so that the follower F follows the mobile object 1 and moves along the first trajectory K1, and the movement controller 150 that controls the mechanism 40 of the mobile object 1 so that the mobile object 1 moves along the second trajectory K2.

According to the first embodiment, since the first trajectory generator 130 generates the first trajectory K1 without considering the mobile object 1 as an object that the follower F is to avoid contact with, it is possible to prevent the occurrence of the inconvenience that the first trajectory K1 is curved to the left and right in order to avoid contact with the mobile object 1 by the follower F.

Second Embodiment

Hereinafter, a second embodiment will be described. The function of the first trajectory generator of the mobile object control device of the second embodiment is different from that of the first embodiment. Therefore, this difference will be mainly described, and the description of the parts common to the first embodiment will be omitted. In the following description, the mobile object control device according to the second embodiment will be referred to as a mobile object control device 100A, and the first trajectory generator according to the second embodiment will be referred to as a first trajectory generator 130A.

Figure 7:
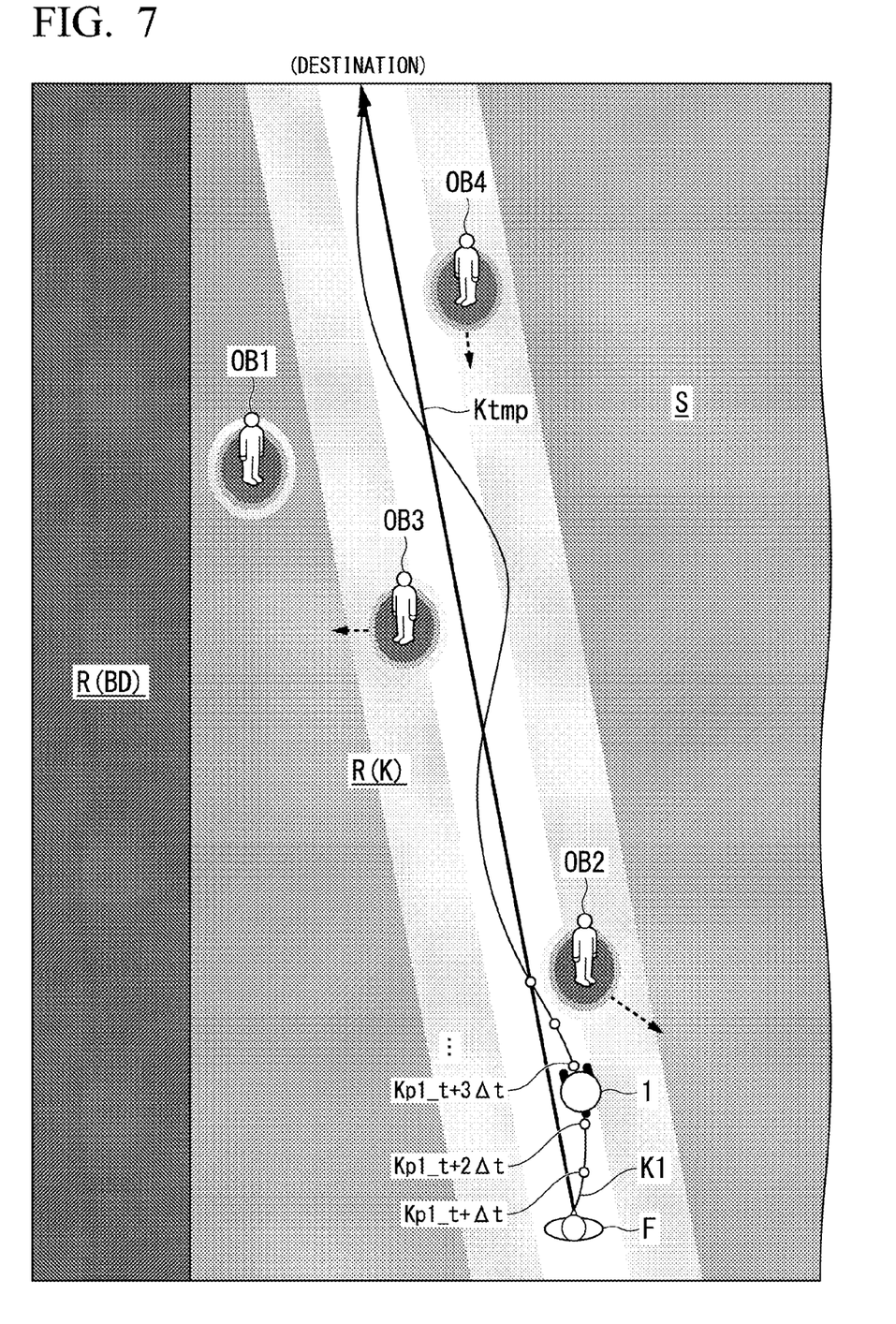
FIG. 7 is a diagram showing an example of a first trajectory generated by a first trajectory generator of a second embodiment.

The first trajectory generator 130A according to the second embodiment generates the first trajectory K1 based on the risk as in the first embodiment, but by adding the restriction of "generation of the first trajectory K1 so as to pass through the location of the mobile object 1". FIG. 7 is a diagram showing an example of the first trajectory K1 generated by the first trajectory generator 130A of the second embodiment. The first trajectory K1 defines the behavior at the time when the follower F moves toward the destination that the follower F first moves to the right toward the location of the mobile object 1, and then the follower F moves to the left as the object OB2 crosses in front of him from left to right, and then the follower F moves to the right as the object OB3 crosses in front of him from right to left, and then the follower F moves while avoiding the object OB4 approaching in opposition to the left.

The functions of the second trajectory generator 140 and the movement controller 150 are the same as those in the first embodiment. As a result of the first trajectory generator 130A generating the first trajectory K1 as described above, the second trajectory generator 140 can generate the second trajectory K2 matching the first trajectory K1 from the beginning if there is no problem of turning angle and the like (in short, if there is no sharp turn above an upper limit when moving along the first trajectory K1). Therefore, according to the second embodiment, since the degree of freedom when assuming the first trajectory candidate K1c of a plurality of patterns can be reduced, the number of patterns can be reduced and the calculation load can be reduced. Further, according to the second embodiment, since the follower F may follow the mobile object 1 from the very beginning, the follower F can be guided intuitively and easily. According to the second embodiment, since the degree of overlap between the movement path of the mobile object 1 and the movement path of the follower F is high, the mobile object 1 can more reliably secure the route for the follower F. Since the first trajectory K1 is generated by reducing the degree of freedom, there may be a case in which the first embodiment is superior in the smoothness of the trajectory.

In principle, the first trajectory generator 130A generates the first trajectory K1 under the above-mentioned restriction, but exceptionally, the first trajectory K1 may be generated by removing the restriction. For example, when the deviation (shortest distance) of the mobile object 1 from the temporary movement path Ktmp is equal to or greater than a predetermined distance, that is, when the mobile object 1 is significantly deviated from the proceeding direction of the follower F, the first trajectory generator 130A may generate the first trajectory K1 by the same method as in the first embodiment without restriction. As a situation in which the deviation (shortest distance) from the mobile object 1 and the temporary movement path Ktmp is equal to or greater than a predetermined distance, for example, immediately after starting to lead the follower F, or the situation in which the follower F moves significantly in the lateral direction for some reason (for example, a stop at a shop) is expected. The method for determining "when the mobile object 1 is significantly deviated from the proceeding direction of the follower F" is not limited to the above. For example, the first trajectory generator 130A may determine that the mobile object 1 is largely deviated from the proceeding direction of the follower F when the distance between the virtual line virtually extended along the body direction or face direction of the follower F, and the mobile object 1 is equal to or greater than a predetermined distance.

Figure 8:
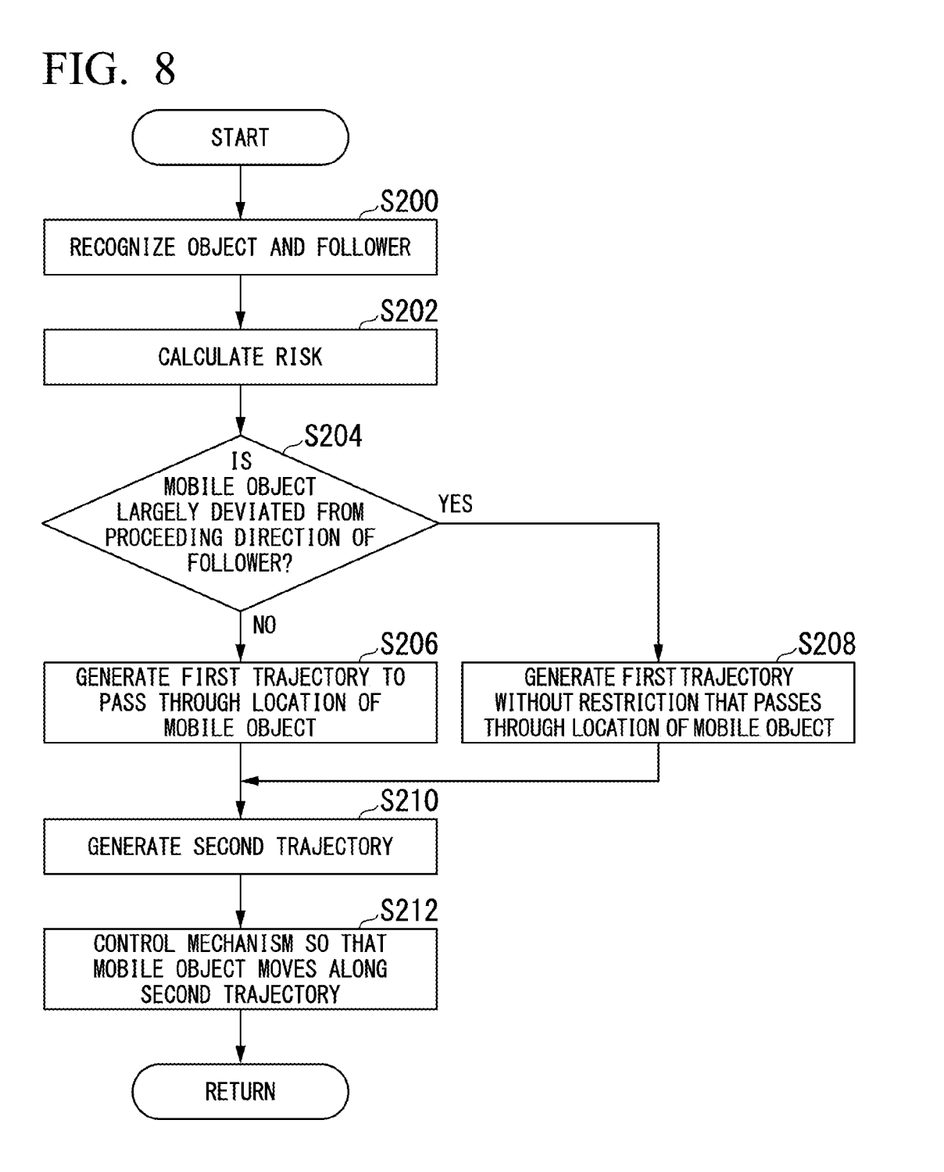
FIG. 8 is a flowchart showing an example of a flow of the process executed by a mobile object control device of the second embodiment.

FIG. 8 is a flowchart showing an example of a processing flow executed by the mobile object control device 100A of the second embodiment. The processing of this flowchart is repeatedly executed, for example, every control cycle.

First, the recognizer 110 recognizes the object around the mobile object 1 and the follower F (step S200), and the risk distribution predictor 120 calculates the risk at each current and future time point (step S202). Next, the first trajectory generator 130A determines whether or not the mobile object 1 is significantly deviated from the proceeding direction of the follower F (step S204). The specific method of this determination is as described above. When it is determined that the mobile object 1 is not significantly deviated from the proceeding direction of the follower F, the first trajectory generator 130A generates the first trajectory K1 so as to pass through the location of the mobile object 1 (step S206). When it is determined that the mobile object 1 is largely deviated from the proceeding direction of the follower F, the first trajectory generator 130A generates the first trajectory K1 without restriction of passing through the location of the mobile object 1 (step S208).

Next, the second trajectory generator 140 generates the second trajectory K2 based on the first trajectory K1 (step S210), and the movement controller 150 controls the mechanism 40 so that the mobile object 1 moves along the second trajectory K2 (step S212).

According to the second embodiment described above, the same effect as that of the first embodiment can be obtained, the calculation load can be reduced, and the follower F can be guided intuitively and easily. Further, the mobile object 1 can more reliably secure the route for the follower F.

[Hardware Configuration]

Figure 9:
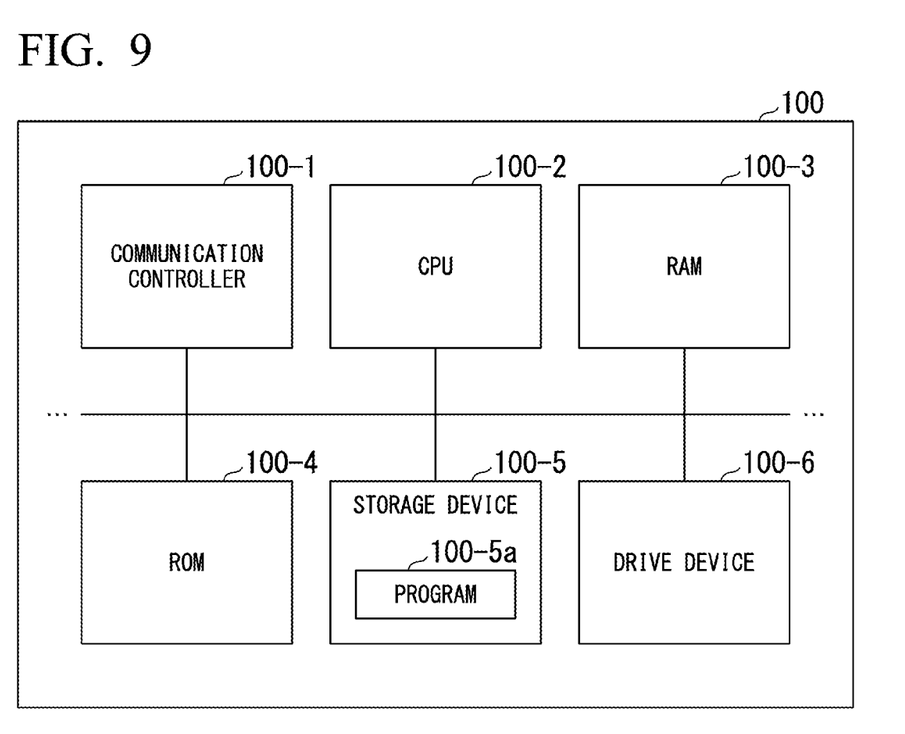
FIG. 9 is a diagram showing an example of a hardware configuration of a mobile object control device of an embodiment.

FIG. 9 is a diagram showing an example of the hardware configuration of the mobile object control device 100 or 100A of the embodiment. As shown in the figure, the mobile object control device 100 or 100A has a configuration in which a communication controller 100-1, a CPU 100-2, a random access memory (RAM) 100-3 used as a working memory, a read only memory (ROM) 100-4 that stores a boot program and the like, a storage device 100-5 such as flash memory and a hard disk drive (HDD), a drive device 100-6, and the like are connected to each other by an internal bus or a dedicated communication line. The communication controller 100-1 communicates with a component other than the mobile object control device 100. The storage device 100-5 stores a program 100-5a executed by the CPU 100-2. This program is expanded to RAM 100-3 by a direct memory access (DMA) controller (not shown) and the like, and is executed by CPU 100-2. As a result, a part or all of the recognizer 110, the risk distribution predictor 120, the first trajectory generator 130 or 130A, the second trajectory generator 140, and the movement controller 150 are realized.

Although the embodiments for carrying out the present invention have been described above using the embodiments, the present invention is not limited to these embodiments, and various modifications and substitutions can be made within the scope without departing from the gist of the present invention.

What is claimed is:

1. A mobile object control method executed by a computer, comprising:
   recognizing an object existing around a mobile object and a pedestrian following the mobile object;
   generating a first trajectory, which is a target trajectory of the pedestrian from a current position of the pedestrian to a destination for the pedestrian to move while avoiding contact with the object based on a result of the recognition;
   after the first trajectory is generated, generating a second trajectory, which is a target trajectory of the mobile object from a current position of the mobile object to the destination, based on the first trajectory so that the pedestrian follows the mobile object and the pedestrian moves along the first trajectory; and
   controlling the mobile object so that the mobile object moves along the second trajectory,
   wherein the generating of the first trajectory, and the generating of the second trajectory based on the first trajectory after the first trajectory is generated, are repeatedly performed in a control cycle that arrives at a predetermined cycle, the first trajectory is updated by changes in a surrounding environment until the pedestrian reaches the destination, and the second trajectory is generated based on the updated first trajectory, and
   wherein the mobile object control method further comprises:
   recognizing a relative location of the object, which is a moving object or a stationary object, as seen from the mobile object;
   converting the relative location of the object, which is a moving object or a stationary object, into a location on an assumption plane that represents a space around the pedestrian as a two-dimensional plane viewed from above;
   predicting a risk at each time point in the future defined at a regular time interval based on a change in the relative location of the object, which is a moving object or a stationary object, on the assumption plane, the risk being an index value indicating a degree to which the pedestrian should not approach to the object, which is a moving object or a stationary object; and
   generating the first trajectory by connecting successively locations where, at each time point in the future, the risk corresponding to the time point does not exceed a threshold value without considering the mobile object as an object that the pedestrian is to avoid contact with.

2. The mobile object control method according to claim 1, further comprising:
   setting a temporary movement path based on the destination of the pedestrian, a location of the pedestrian, and map information; and
   predicting the risk so that the larger a degree away from the temporary movement path, the greater the risk.

3. The mobile object control method according to claim 1, wherein the generating of the second trajectory comprises generating the second trajectory based on the risk, and a degree of risk tolerance in the second trajectory is looser than that of the first trajectory.

4. The mobile object control method according to claim 1, wherein generating of the first trajectory comprises generating the first trajectory so that the pedestrian avoids contact with the object and a degree of turning of the first trajectory is reduced.

5. The mobile object control method according to claim 1, wherein the controlling of the mobile object comprises controlling the mobile object to adjust a speed of the mobile object so that a distance between the mobile object and the pedestrian is maintained at a constant interval.

6. The mobile object control method according to claim 1, further comprising:
   setting a temporary movement path based on the destination of the pedestrian, a location of the pedestrian, and map information;
   determining whether a deviation between a location of the mobile object and the temporary movement path is equal to or greater than a predetermined distance;
   when determining that the deviation is equal to or greater than the predetermined distance, generating the first trajectory without restriction of passing through the location of the mobile object; and
   when determining that the deviation is not equal to or greater than the predetermined distance, generating the first trajectory so as to pass through the location of the mobile object.

7. The mobile object control method according to claim 1, further comprising:
   determining whether a distance between a virtual line virtually extended along a body direction or face direction of the pedestrian, and the mobile object is equal to or greater than a predetermined distance;
   when determining that the distance is equal to or greater than the predetermined distance, generating the first trajectory without restriction of passing through a location of the mobile object; and
   when determining that the distance is not equal to or greater than the predetermined distance, generating the first trajectory so as to pass through the location of the mobile object.

8. A mobile object control device comprising:
   a storage device that stores a program, and
   a hardware processor,
   wherein, by executing the program stored in the storage device, the hardware processor performs:
   recognizing an object existing around a mobile object and a pedestrian following the mobile object;
   generating a first trajectory, which is a target trajectory of the pedestrian from a current position of the pedestrian to a destination for the pedestrian to move while avoiding contact with the object based on a result of the recognition;

after the first trajectory is generated, generating a second trajectory, which is a target trajectory of the mobile object from a current position of the mobile object to the destination, based on the first trajectory so that the pedestrian follows the mobile object and the pedestrian moves along the first trajectory; and controlling the mobile object so that the mobile object moves along the second trajectory, wherein the generating of the first trajectory, and the generating of the second trajectory based on the first trajectory after the first trajectory is generated, are repeatedly performed in a control cycle that arrives at a predetermined cycle, the first trajectory is updated by changes in a surrounding environment until the pedestrian reaches the destination, and the second trajectory is generated based on the updated first trajectory, and wherein the hardware processor further performs:

recognizing a relative location of the object, which is a moving object or a stationary object, as seen from the mobile object;

converting the relative location of the object, which is a moving object or a stationary object, into a location on an assumption plane that represents a space around the pedestrian as a two-dimensional plane viewed from above;

predicting a risk at each time point in the future defined at a regular time interval based on a change in the relative location of the object, which is a moving object or a stationary object, on the assumption plane, the risk being an index value indicating a degree to which the pedestrian should not approach to the object, which is a moving object or a stationary object; and generating the first trajectory by connecting successively locations where, at each time point in the future, the risk corresponding to the time point does not exceed a threshold value without considering the mobile object as an object that the pedestrian is to avoid contact with.

9. A mobile object comprising:

the mobile object control device according to claim 8.

10. A computer-readable non-transitory storage medium that stores a program causing a computer to:

recognize an object existing around a mobile object and a pedestrian following the mobile object;

generate a first trajectory, which is a target trajectory of the pedestrian from a current position of the pedestrian to a destination for the pedestrian to move while avoiding contact with the object based on a result of the recognition;

after the first trajectory is generated, generate a second trajectory, which is a target trajectory of the mobile object from a current position of the mobile object to the destination, based on the first trajectory so that the pedestrian follows the mobile object and the pedestrian moves along the first trajectory; and control the mobile object so that the mobile object moves along the second trajectory, wherein the generating of the first trajectory, and the generating of the second trajectory based on the first trajectory after the first trajectory is generated, are repeatedly performed in a control cycle that arrives at a predetermined cycle, the first trajectory is updated by changes in a surrounding environment until the pedestrian reaches the destination, and the second trajectory is generated based on the updated first trajectory, and wherein the program further causes a computer to:

recognize a relative location of the object, which is a moving object or a stationary object, as seen from the mobile object;

converting the relative location of the object, which is a moving object or a stationary object, into a location on an assumption plane that represents a space around the pedestrian as a two-dimensional plane viewed from above;

predict a risk at each time point in the future defined at a regular time interval based on a change in the relative location of the object, which is a moving object or a stationary object, on the assumption plane, the risk being an index value indicating a degree to which the pedestrian should not approach to the object, which is a moving object or a stationary object; and generate the first trajectory by connecting successively locations where, at each time point in the future, the risk corresponding to the time point does not exceed a threshold value without considering the mobile object as an object that the pedestrian is to avoid contact with.

* * * * *